Oct. 31, 1961 G. R. TAYLOR 3,007,112
ELECTRICAL INDICATING OR MEASURING INSTRUMENTS
Filed Oct. 16, 1959 2 Sheets-Sheet 1

INVENTOR
GRAHAM ROSS TAYLOR
BY Hane and Nydick
ATTORNEYS

United States Patent Office 3,007,112
Patented Oct. 31, 1961

3,007,112
ELECTRICAL INDICATING OR MEASURING INSTRUMENTS
Graham R. Taylor, Southgate, London, England, assignor to Electronic Instruments Limited, Richmond, Surrey, England
Filed Oct. 16, 1959, Ser. No. 846,836
Claims priority, application Great Britain Oct. 24, 1958
10 Claims. (Cl. 324—111)

This invention relates to electrical indicating or measuring instruments which are responsive to very small unidirectional currents or voltages.

According to the present invention there is provided electrical indicating or measuring equipment comprising first and second reactive elements in series across the input to an amplifier, said second reactive element having a larger value than said first reactive element, the application of a small unidirectional current or voltage to be indicated or measured to said first reactive element causing said amplifier to produce an output current which flows in said second reactive element and through indicating or measuring means, said output current being proportional to the current or voltage to be measured.

Figure 1:
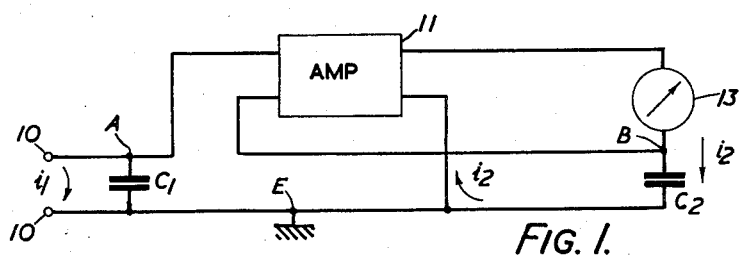
Figure 2:
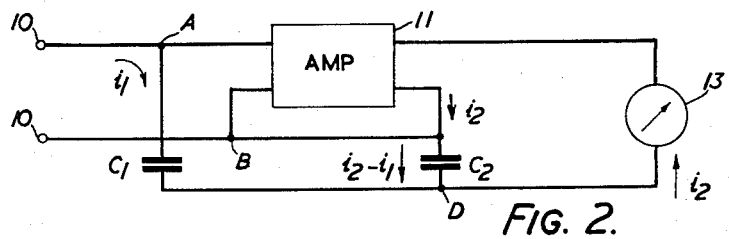
Figure 3:
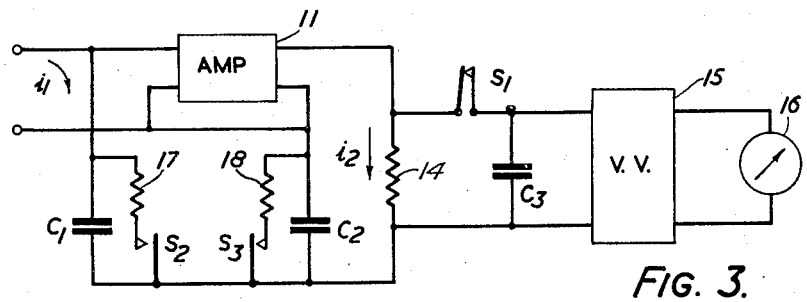
Figure 4:
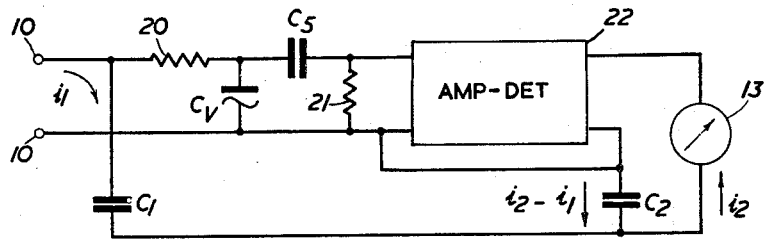
Figure 5:
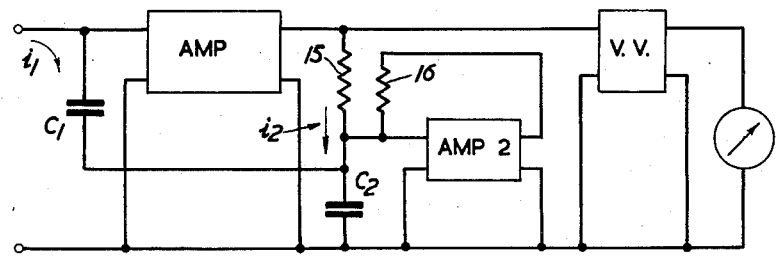
Figure 6:
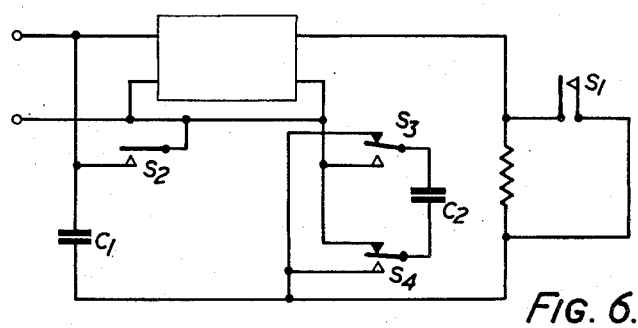
Figure 7:
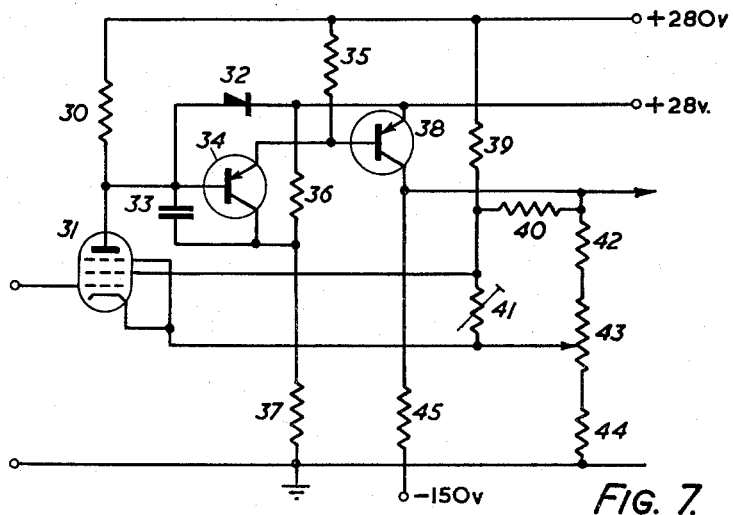

Features and advantages of the invention will appear from the following description of embodiments thereof, given by way of example, in conjunction with the accompanying drawings in which FIGURES 1, 2, 3, 4 and 5 are schematic arrangements of the different embodiments, FIGURE 6 shows a modification of part of the circuit of FIGURE 3, and FIGURE 7 is a direct current amplifier suitable for use in the above circuits.

In the arrangement of FIGURE 1, a very small current $i_1$ to be measured or indicated is applied to terminals 10, and is thereby caused to charge a capacitor $C_1$. In such a case, the rate of change of voltage on the capacitor is a function of the input current, since:

$$i_1 = C_1 dv/dt$$

where $v$ and $t$ are voltage and time respectively. It is possible to use such an arrangement by observing the rise in voltage on the capacitor, by, say, an electrometer over a given period of time, but the accuracy of the method is impaired if the applied current varies during the period of observation.

Accordingly, to avoid this limitation, and to provide an instrument which can be used with a varying current, the capacitor $C_1$ is coupled to the input of electrometer amplifier 11, in series with a capacitor $C_2$. The capacitor $C_2$ is also included in the output of amplifier 11, where it is in series with a current sensitive device, such as a meter 13.

It is arranged that the capacitance of capacitor $C_2$ is much greater than that of $C_1$; the capacitance of $C_1$ will normally be very small and may be so small as to be provided by an input capacitance of the amplifier 11. Amplifier 11 is a D.C. amplifier having a very high input resistance, and its design is such that a small potential applied to the input terminals produces a large output current, the value of this output being substantially unaffected by change in the potential between the output terminals; that is, the amplifier has a high output impedance and high transconductance.

Regarding point E as of zero potential, current $i_1$ flowing in the direction shown will cause point A to become positive, so that an input potential to the amplifier appears between points A and B. This will cause an output current $i_2$ to flow as shown causing the point B to become positive to E. It cannot become more positive than A, however, as this would reverse the current $i_2$. If the amplifier has a high transconductance, the potential of B will follow that of A closely and the rate of rise of potential $dv/dt$ will be the same for the two condensers $C_1$ and $C_2$.

Therefore $$i_1 = C_1 \frac{dv}{dt}$$

and $$i_2 = C_2 \frac{dv}{dt}$$

therefore $$\frac{i_2}{i_1} = \frac{C_2}{C_1}$$

If $i_2$ is measured and the ratio of the capacities is known, $i_1$ can be determined.

A change in the value of $i_1$ causes a change in the rate of rise of point A and $i_2$ will automatically adjust itself to keep point B close to the potential of A. This adjustment will not be quite instantaneous, as the input potential to the amplifier between A and B must change to bring about the change in $i_2$, and this change is brought about by a temporary inequality in the rates of rise of A and B. It can be shown that $i_2$ will follow changes in $i_1$ in an exponential manner with a time constant proportional to the sum of $C_1$ and the input capacity of the amplifier between A and B, and inversely proportional to the transconductance of the amplifier. By suitable design, the time constant can be made very short.

In the circuit shown in FIGURE 1, the amplifier has no common input and output terminal. This arrangement is, therefore, limited to those types of amplifier in which the output circuit can be isolated from the input such as vibrating capacitor or contact modulated amplifiers in which the interposition of an alternating current section allows an isolating transformer to be used. Further, the potential of point A fluctuates considerably which, in some applications, may affect the value of $i_1$ and if the lead through which $i_1$ is brought to the apparatus has an appreciable capacity, this must be added to $C_1$ when determining the ratio $C_2/C_1$.

Vibrating capacitor amplifiers suitable for use in the circuit of FIGURE 1 are well-known, and so will not be described in the present specification. Such amplifiers are described in "Design of dynamic condenser electrometers" by H. Palevsky, R. K. Swank, and R. Grenchik, in Revue of Scientific Instruments, vol. 18, No. 5, May 1947.

An alternative arrangement shown in FIGURE 2 minimises these disadvantages and permits the use of a three-terminal amplifier with a common input and output terminal. In this circuit, the small current $i_1$ is applied directly from terminals 10 to the two terminals A, B of an amplifier 11 of similar characteristics to that described previously. If the direction is such that A becomes positive, the output current $i_2$ is in the direction shown. This output current, as before, is passed through a current measuring device and fed into the large capacitor $C_2$.

The resulting potential rise across $C_2$ carries point D negative to points B and A, thus causing current to flow from A into the capacitor $C_1$. If the amplifier has a high transconductance, the potential between A and B remains very small while that between D and B increases at a rate $dv/dt$ sufficient to absorb the current $i_1$ in the capacity $C_1$. This is governed by the reation $$i_1 = C_1 \frac{dv}{dt}$$

The voltage across $C_2$ increases at the same rate. The current in this capacitor is the difference between $i_2$ and $i_1$.

$$i_2 - i_1 = C_2 \frac{dv}{dt}$$

therefore $$\frac{i_2 - i_1}{i_1} = \frac{C_2}{C_1}$$

or $$\frac{i_2}{i_1} - 1 = \frac{C_2}{C_1}$$

Since the system is designed to make $i_2$ very much larger than $i_1$, the ratio $i_2/i_1$ will always be much greater than 1 so that to a close approximation $$\frac{i_2}{i_1} = \frac{C_2}{C_1}$$

as in the system previously described.

The potential at the input terminals 10 of the device varies very little compared with that across the capacitors $C_1$ and $C_2$, therefore the capacity of the input lead has little effect on the operation, while the input resistance of the whole device will be low, which is desirable in a current measuring instrument.

Both instruments described can operate for a limited time only before the amplifier reaches saturation. It is then necessary to discharge the two capacitors by short-circuiting them individually in order to re-start the operation. For some purposed this period will be adequate to make the required measurement and the discharging operation can be performed by manually operated switches. However, it may be required to record the value of $i_1$ over a long period and then it is desirable to perform the discharging operation automatically and without disturbing the reading.

An arrangement for this purpose is shown in FIGURE 3. In FIGURE 3, the current $i_1$ to be measured is applied to capacitor $C_1$ as before, in series with $C_2$ in the input to amplifier 11, in the manner described with reference to FIGURE 2. In FIGURE 3, however, the meter 13 is replaced by a resistor 14 connected over switch contacts $S_1$ to the input of a valve voltmeter circuit 15 and indicator 16. A capacitor $C_3$ shunts the input of the voltmeter circuit 15. Also, capacitor $C_1$ is shunted by a discharge resistor 17 in series with contacts $S_2$, and capacitor $C_2$ is shunted by a discharge resistor 18 in series with contacts $S_3$.

In normal operation, contacts $S_1$ are closed, and $S_2$ and $S_3$ are open.

The current $i_2$, through, and hence the voltage across, the resistor 14 will be related to the input current $i_1$ as described above. The capacitor will assume this voltage, and the current will be indicated by the meter 16.

At an appropriate time, contact $S_1$ is opened, leaving capacitor $C_3$ connected to the valve voltmeter and therefore sustaining the indication of meter 16. Contacts $S_2$ and $S_3$ close, to discharge capacitors $C_1$ and $C_2$, and then open again to allow current $i_2$ to revert to its original value. Finally, contacts $S_1$ close again, to restore the circuit to its initial condition.

This process may be performed in a fraction of a second. If current $i_1$ is constant during this time no change will occur in the valve voltmeter reading. If current $i_1$ is varying, the reading will remain stationary during the discharging period, subsequently catching up to the correct reading. The various switch contacts can be operated by a relay circuit, the sequence being initiated either at fixed intervals by a timing device or by an auxiliary circuit arranged to act when the voltage across capacitor $C_2$ reaches some predetermined value.

The circuits of FIGURES 2 and 3 can in principle be constructed with any type of D.C. amplifier, but the method is particularly suited to use with a vibrating capacitor amplifier, and a circuit arrangement of this type, similar to the circuit of FIGURE 2 but applicable also to the circuits of FIGURES 1 and 3, is shown in FIGURE 4. In FIGURE 4, the vibrating capacitor $C_v$, in series with a resistor 20 is connected in parallel with the input terminals 10. The alternating component of the voltage on capacitor $C_v$ is applied through capacitor $C_5$, with shunt resistor 21, to the input of an A.C. amplifier and detector 22. Capacitors $C_1$ and $C_2$ and the indicator or the like 13 are associated with the input and output of the amplifier in the manner described above.

Such an arrangement has the advantage that it is truly electrostatic, taking no direct current through the resistor 20 input except that due to imperfections in its insulating materials and that required to charge its self-capacity. Thus, the current $i_1$ flows wholly into $C_1$, no part of it being lost in the amplifier. When a vibrating capacitor amplifier is used the capacitor $C_1$ can also act as the coupling capacitor to the A.C. amplifier.

An important advantage of the method described is that zero drift of the amplifier will only affect the accuracy of measurement if the rate of drift is comparable to the rate of rise of voltage across $C_1$. Thus, zero drift is unimportant provided that it is slow. This gives the vibrating capacitor type of amplifier a further advantage as not only is its zero drift less than other types of amplifier but it is free from rapid changes.

In FIGURE 5 there is shown a variant of the circuit shown in FIGURE 3. In FIGURE 3, if the source of the current $i_1$ has its lower terminal earthed, then both ends of the resistor 14 (FIGURE 3) vary in potential with respect to earth. Hence the valve voltmeter VV and meter 16 cannot be earthed at any point. It is advantageous in certain cases to have both the input and output earthed at one side. This is achieved in the circuit of FIGURE 5.

The voltage across the capacitor $C_2$ is applied to the input of an amplifier $AMP_2$, having a gain $a$ determined precisely in well-known manner by an internal feedback loop. The output voltage of $AMP_2$ feeds current into $C_2$ through a resistor 16. The gain $a$ and the value at 16 are related to the value of resistor 15 (corresponding to resistor 14 of FIGURE 3) in the following manner $$\frac{R_2}{R_1} = (a-1)$$

For example, if $a=2$, then $R_2$ (the value of resistor 16) is equal to $R_1$ (the value of resistor 15).

As the voltage across $C_2$ rises, the current $i_2$ into $C_2$ is supplied more and more via 16 and less and less via 15. If the above holds it can be shown that the voltage across $C_2$ and 15 together is independent of the voltage across $C_2$, but is proportional to $i_2$. The valve voltmeter VV can then be connected across $C_2$ and 15, instead of across 15 only, as is shown in FIGURE 5. All the amplifiers, the input current, and the output meter then have a common terminal which can be earthed.

To obtain a high enough capacity for $C_2$ it is convenient to use a paper dielectric capacitor. In such a case the method of discharging $C_2$ used in FIGURE 3 has the disadvantage that, due to dielectric absorption in $C_2$, a spurious current flows for several seconds after the sudden change in potential. This causes a temporary error in the current reading on the meter immediately after the discharging operation. This difficulty can be avoided if, instead of discharging $C_2$, $C_2$ is reversed by a pair of change-over contacts $S_3$, $S_4$, as shown in FIGURE 6. At the same time as this happens $C_1$ is connected across $C_2$ via $S_2$. The current $i_2$ then flows into $C_2$ in the opposite sense, so as to reduce its potential gradually to zero and to charge it up in the opposite sense, after which it is reversed again.

Thus the switch operation sequence in FIGURE 6 is (a) $S_1$ opens, (b) $S_2$ closes, (c) $S_3$ and $S_4$ change over, (d) $S_2$ opens, (e) $S_1$ closes.

FIGURE 7 shows and example of a direct current amplifier which can be used in the circuits of FIGURE 5 above. This amplifier has a nominal gain of 2, with small adjustment to cover tolerance in resistors 15, 16 (see FIGURE 5). The value of the components used are

| | |
|---|---|
| 30 | 10 megohms. |
| 31 | EF86 pentode. |
| 32 | SX641 diode. |
| 33 | 500 pf. |
| 34 | OC200 transistor. |
| 35 | 1 megohm. |
| 36 | 1 kilohm. |
| 37 | 15 kilohms. |
| 38 | OC77 transistor. |
| 39 | 1 megohm. |
| 40 | 1 megohm. |
| 41 | 320 kilohms approx. |
| 42 | 15 kilohms. |
| 43 | 400 ohms. |
| 44 | 15 kilohms. |
| 45 | 100 kilohms. |

Of the above components, resistor 40 together with resistor 39 together serve to feed half of the output of the amplifier back to the screen of the pentode 31. This keeps the screen-cathode potential constant and avoids unwanted screen feedback. The feedback ratio of the circuit is about 300, thus attaining a high degree of stability.

Similar amplifiers to FIGURE 7 could be used in the other circuits described herein: for the valve voltmeter a moving coil voltmeter is connected across the output. In this case the feedback potentiometer 43, adjustment of which varies the gain can be omitted and the cathode of tube 31 connected directly to the output terminal to give unity gain.

I claim:

1. Electrical measuring equipment, comprising a direct current amplifier having a pair of input terminals and a pair of output terminals, first and second capacitive elements connected in series between said input terminals, the second capacitive element having a value larger than the first capacitive element, measuring means, connections from the output terminals of said amplifier to said measuring means such that said measuring means and said second capacitive element are in series across the output terminals of said amplifier, whereby said second capacitive element acts as an output-input feedback coupling, and connections for applying a small unidirectional current to be measured to said first capacitive element and hence to the input of said amplifier, such current causing said amplifier to produce an output current in said measuring means and in said second capacitive element, said output current being larger than and proportional to the value of said input current to be measured, the ratio of said proportionality being substantially the same as the ratio of the value of said second capacitive element to that of said first capacitive element.

2. Equipment as claimed in claim 1, wherein said measuring means comprises a resistor through which flows said amplifier's output current, and a valve voltmeter measuring the voltage across said resistor due to said output current.

3. Equipment as claimed in claim 1, and which comprises means for periodically discharging said capacitive elements.

4. Electrical measuring equipment comprising a direct current amplifier including a vibratory capacitor in conjunction with an amplifier-detector circuit, said amplifier having a pair of input terminals and a pair of output terminals, first and second capacitive elements connected in series between said input terminals, the second capacitive element having a larger value than the first capacitive element, measuring means, connections from the output of said amplifier to said measuring means such that said measuring means and said second capacitive element are in series across the output terminals of said amplifier, whereby said second capacitive element acts as an output-input feedback coupling, and connections for applying a small unidirectional current to be measured to said first capacitive element and hence to the input of said amplifier, such current causing said amplifier to produce an output current in said measuring means and said second capacitive element, said output current being larger than and prportional to the value of said input current, the ratio of said proportionality being substantially the same as the value of said second capacitive element to the value of said first capacitive element.

5. Electrical measuring equipment, comprising a direct current amplifier having a pair of input terminals and a pair of output terminals, first and second capacitive elements connected in series between said input terminals, the second capacitive element having a value larger than said first capacitive element, a resistive impedance, connections from the output terminals of said amplifier to said resistive impedance such that said resistive impedance and said second capacitive element are in series across the output terminals of said amplifier, whereby said second capacitive element acts as an output-input feedback coupling, connections for applying a small unidirectional current to be measured to said first capacitive element and hence to the input to said amplifier, such current causing said amplifier to produce an output current in said resistive impedance and in said second capacitive element, said output current being larger than and proportional to the value of said input current to be measured, the ratio of said proportionality being substantially the same as the ratio of the value of said second capacitive element to that of said first capacitive element, and a valve voltmeter connectable to said resistive impedance whereby said valve-voltmeter measures the voltage across said resistive impedance means due to the current flow therein, said voltage being proportional to the value of said input current to be measured.

6. Equipment as claimed in claim 5, and which comprises means for periodically discharging said capacitive elements, said means including switching means for reversing the connections to the second capacitive element so that its charging current effects said discharge.

7. Equipment as claimed in claim 5, and which comprises a further direct current amplifier to the input of which said second capacitive element is connected, and a feedback connection from the output of said further direct current amplifier to the input thereof.

8. Equipment as claimed in claim 5, and which comprises means for periodically discharging said capacitive elements, said means including two normally-open contacts each in series with a resistor, each series combination of a normally-open contact and a resistor being connected across one of said capacitive elements, and means for isolating said valve voltmeter from said resistor, wherein to effect said discharge the valve voltmeter is disconnected from said resistor, said contacts being closed to effect said discharge and thereafter opened, whereafter said valve voltmeter is again connected to said resistor.

9. Equipment as claimed in claim 8, wherein the input circuit to said valve voltmeter includes a capacitor maintaining the input to said valve voltmeter substantially constant while said capacitive elements are being discharged.

10. Electrical measuring equipment comprising a first direct current amplifier having a pair of input terminals and a pair of output terminals, first and second capacitive elements connected in series between said input terminals, said second capacitive element having a value larger than said first capacitive element, a resistive impedance, connections from the output terminals of said amplifier to said resistive impedance such that said resistive impedance and said second capacitive element are in series across the output terminals of said amplifier, whereby said second capacitive element acts as an output-input coupling, connections for applying a small unidirectional current to be measured to said first capacitive element and hence to the input to said amplifier, such current causing said amplifier to produce an output current in said resistive impedance and in said second capacitive element, said output current being larger than and proportional to the value of said input current to be measured, the ratio of said proportionality being substantially the same as the ratio of the value of said second capacitive element to that of said first capacitive element, a second, highly-stable, direct current amplifier having an output-input feedback loop whose input terminals are connected across said second capacitive element, and a valve voltmeter having input terminals connected across the series combination of said resistive impedance and second capacitive element, so that said valve voltmeter measures the voltage thereacross which voltage is proportional to the value of said input current to be measured.

References Cited in the file of this patent

UNITED STATES PATENTS

| | | |
|---|---|---|
| 2,297,543 | Eberhardt | Sept. 29, 1942 |
| 2,673,329 | Frommer | Mar. 23, 1954 |
| 2,779,921 | Hawes | Jan. 29, 1957 |